United States Patent [19]
Habboosh et al.

[11] Patent Number: 5,786,919
[45] Date of Patent: Jul. 28, 1998

[54] DATA MULTIPLEXING NODE FOR LINE ARRAY

[75] Inventors: Amir W. Habboosh, Somerset, Mass.; Robert J. Reid, Tiverton; Steven D. Jette, Exeter, both of R.I.

[73] Assignee: The United States of America as represented by the Secretary of the Navy, Washington, D.C.

[21] Appl. No.: 706,590

[22] Filed: Sep. 5, 1996

[51] Int. Cl.⁶ .................................................. H04J 3/00
[52] U.S. Cl. ...................... 359/135; 359/137; 359/158; 370/271
[58] Field of Search ........................... 359/135, 137, 359/158; 370/271, 522

[56] References Cited

U.S. PATENT DOCUMENTS

| | | | |
|---|---|---|---|
| 5,144,669 | 9/1992 | Faulkner et al. | 370/516 |
| 5,594,726 | 1/1997 | Thompson et al. | 370/485 |
| 5,719,872 | 2/1998 | Dubberly et al. | 370/487 |

*Primary Examiner*—Edward Lefkowitz
*Attorney, Agent, or Firm*—Michael J. McGowan; Prithvi C. Lall; Michael F. Oglo

[57] ABSTRACT

A multiplexing node is associated with each analog sensor of a line array. Each multiplexing node has an amplifier/filter section coupled to its associated analog sensor for amplifying and shaping a signal generated by the sensor. An A/D converter then samples the signal. A receiver is coupled to a previous one of the multiplexing nodes for receiving scrambled data and clock information in serial fashion from the previous node. A descrambler is coupled to the receiver to separate the data from the clock. A processor is coupled to the A/D converter and the descrambler. The processor time division multiplexes the data and clock from the previous node with the sampled signal from the A/D converter. The processor scrambles the so multiplexed data, clock and sampled signal. A transmitter is coupled to the processor to transmit the scrambled data, clock and sampled signal in serial fashion over a single data line.

5 Claims, 6 Drawing Sheets

DATA MULTIPLEXING NODE FOR LINE ARRAY

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

(1) Field of the Invention

The present invention relates generally to multiplexing data for line arrays, and more particularly a multiplexing node associated with each sensor of a line array that allows data to be transmitted over a single cable.

(2) Description of the Prior Art

In the field of sensor arrays, a variety of data transmission systems are used to transport data from each sensor back to a host location. Some use a dedicated (coax) cable, running from each sensor to the host location. Other systems multiplex the data from a small group of sensors onto a cable such that a plurality of the cables are routed to the host location. Sensor arrays transmitting data in this fashion are usually deployed over lengths of only a few hundred yards. Thus, the amount of cable required does not present much of a problem. However, when a sensor array is to be deployed as a line array over great distances, e.g., several miles, it is desirable to reduce the number of cables required to interconnect the sensors, and improve the speed and efficiency of data transmission.

SUMMARY OF THE INVENTION

Accordingly, it is an object of the present invention to provide a data transmission scheme for long-line sensor arrays.

Another object of the present invention is to provide a data transmission scheme for line arrays that utilizes a single transmission cable between sensors or nodes of a line array.

Other objects and advantages of the present invention will become more obvious hereinafter in the specification and drawings.

In accordance with the present invention, a sensor system has each of a plurality of multiplexing nodes associated with one of a plurality of analog sensors which are arranged in a line array. Each multiplexing node has an amplifier/filter section coupled to an associated one of the analog sensors for amplifying and shaping a signal generated by the sensor. An analog-to-digital (A/D) converter samples the signal after amplifying and shaping. A receiver is coupled to a previous one of the multiplexing nodes for receiving scrambled data in serial fashion from the previous node. The scrambled data contains both data information and clock information from the previous node. A descrambler is coupled to the receiver to separate the data information from the clock information. A processor is coupled to the A/D converter and the descrambler. The processor checks the data information for the presence of a code. The presence of the code causes the processor to be placed in a slave mode while the absence of the code causes the processor to be placed in a master mode. When the processor is placed in the master mode, the processor adds the code to the data information. The processor time division multiplexes the data, clock and signal. The processor also scrambles the multiplexed data, clock and signal. A transmitter is coupled to the processor to transmit the data, clock and signal (after scrambling) in serial fashion over a single data line to a next one of the multiplexing nodes.

BRIEF DESCRIPTION OF THE DRAWING(S)

Other objects, features and advantages of the present invention will become apparent upon reference to the following description of the preferred embodiments and to the drawings, wherein.

DESCRIPTION OF THE PREFERRED EMBODIMENT(S)

Figure 1:
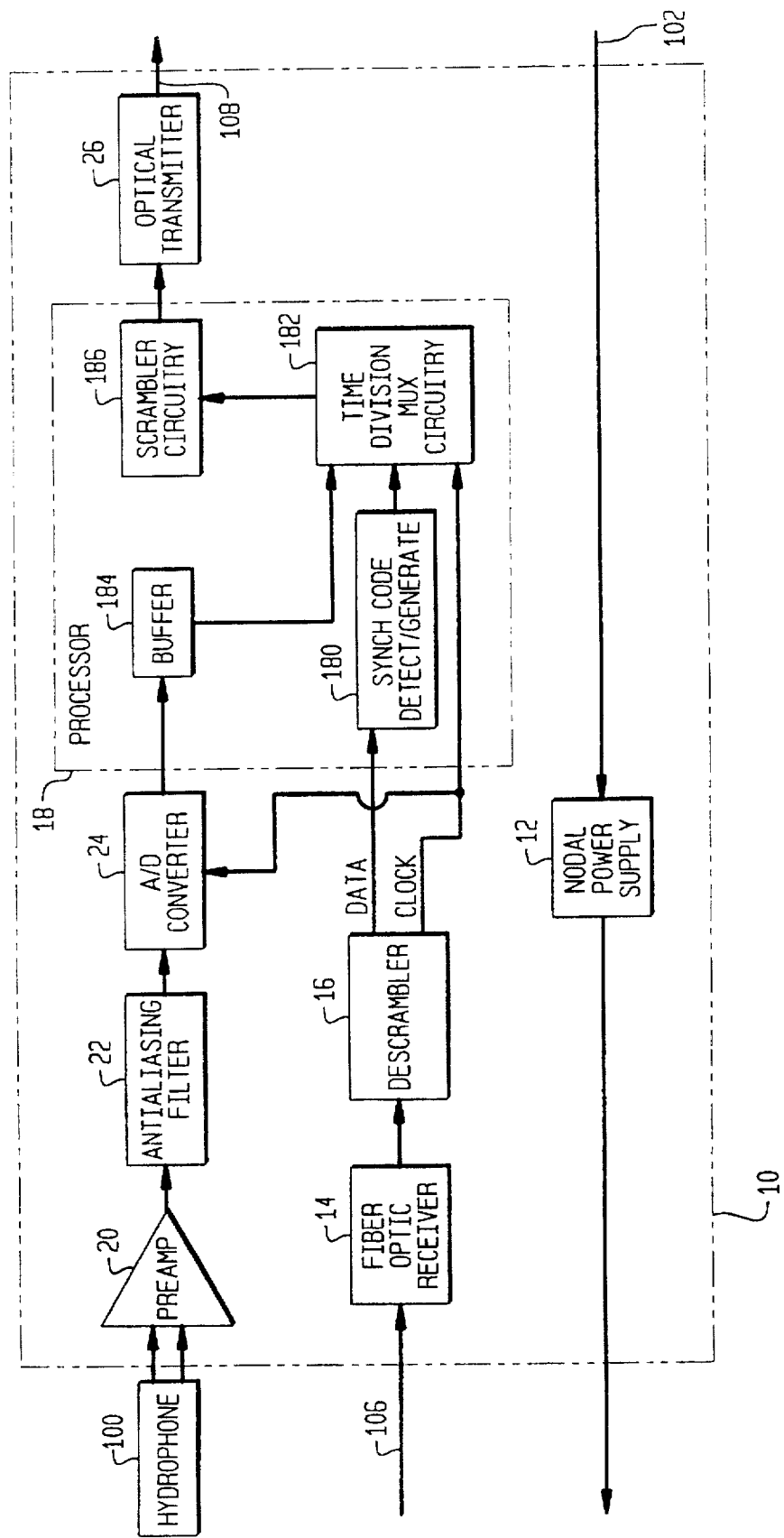
FIG. 1 is a block diagram of a line array's data multiplexing node according to the present invention.

Referring now to the drawings, and more particularly to FIG. 1, a block diagram is shown of a data multiplexing node used by the present invention in conjunction with a line array of sensors. The type of sensor used is not a limitation of the present invention. By way of example, the sensor associated with the node is represented by hydrophone 100. The elements comprising the data multiplexing node are contained within the dashed-line box referenced by numeral 10.

For purpose of description, it is first assumed that node 10 is not the last (i.e., furthest) node in such a line array. Accordingly, node 10 is fed by lines 102 and 106. Line 102 is an electrically conducting (e.g., copper) line used to deliver power to all elements requiring same in node 10. Line 106 is an optical fiber connected to the previous upstream node (provided node 10 is not the last node in the line array). Since node 10 is only one of a number of serially connected nodes, line 102 delivers sufficient power for the entire line array. Thus, nodal power supply 12 is provided to drop and regulate the voltage/current necessary for the remaining elements of node 10. In this way, each node 10 is essentially powered by its own independent supply. Because the nodal power supplies are tied serially, the remaining voltage is transferred to the next node in the line array on line 104.

Data is transmitted from an upstream node to node 10 via line 106 which is a single mode fiber optic cable in the present invention. Data is received at node 10 by fiber optic receiver 14 which typically includes a photodiode and amplifier circuitry for converting the incoming optical signal from previous nodes to an electrical signal. By way of example, fiber optic receiver 14 can be the ODL-50 long wavelength lightwave data link receiver manufactured by AT&T. Since the data coming in on line 106 is scrambled, i.e., the actual digital Non-Return to Zero (NRZ) signal is mixed with the data rate clock to produce a single signal, receiver 14 outputs the scrambled signal to descrambler 16. The method of scrambling will be discussed further below. The data is scrambled for two reasons. First, since there is only one fiber for data transmission and the clock is required for synchronization of the nodes, the data and clock must be mixed on a single fiber. Second, scrambling makes the signal less sensitive to noise.

The scrambled data from previous nodes(s) must be descrambled prior to being multiplexed with the data collected by hydrophone 100. Accordingly, descrambler 16 must take the data outputs of receiver 14, recover the clock, and re-time the data to the recovered clock. By way of example, descrambler 16 could be the T7032 clock recovery circuit manufactured by AT&T. The recovered clock and re-timed data are input to processor 16 which will be described further below.

The data being collected at node 10 by hydrophone 100 is amplified at pre-amplifier 20 and filtered at anti-aliasing filter 22. Pre-amplifier 20 is used to shape and amplify the signal output from hydrophone 100 as early as possible in the electronics of node 10. This reduces the influence of digital and/or analog electronic noise that could be introduced by the remaining components. Anti-aliasing filter 22 further shapes the signal output from pre-amplifier 20 in order to reduce the effects of aliasing and eliminate the inherent AC noise (e.g., 60 Hz) noise on (power) line 102. Whenever digital sampling is used, the possibility of aliasing is introduced. The aliased signals could interfere with the signals of interest if their amplitude is not significantly attenuated. In general, all signals above one-half the Nyquist frequency must be filtered. The Nyquist problem occurs regardless of the sampling rates. Ideally, the desired sampling rate is at least twice the signal bandwidth. A preferred embodiment of the combination of preamplifier 20 and anti-aliasing filter 22 is shown in a schematic view in FIG. 2.

Figure 2:
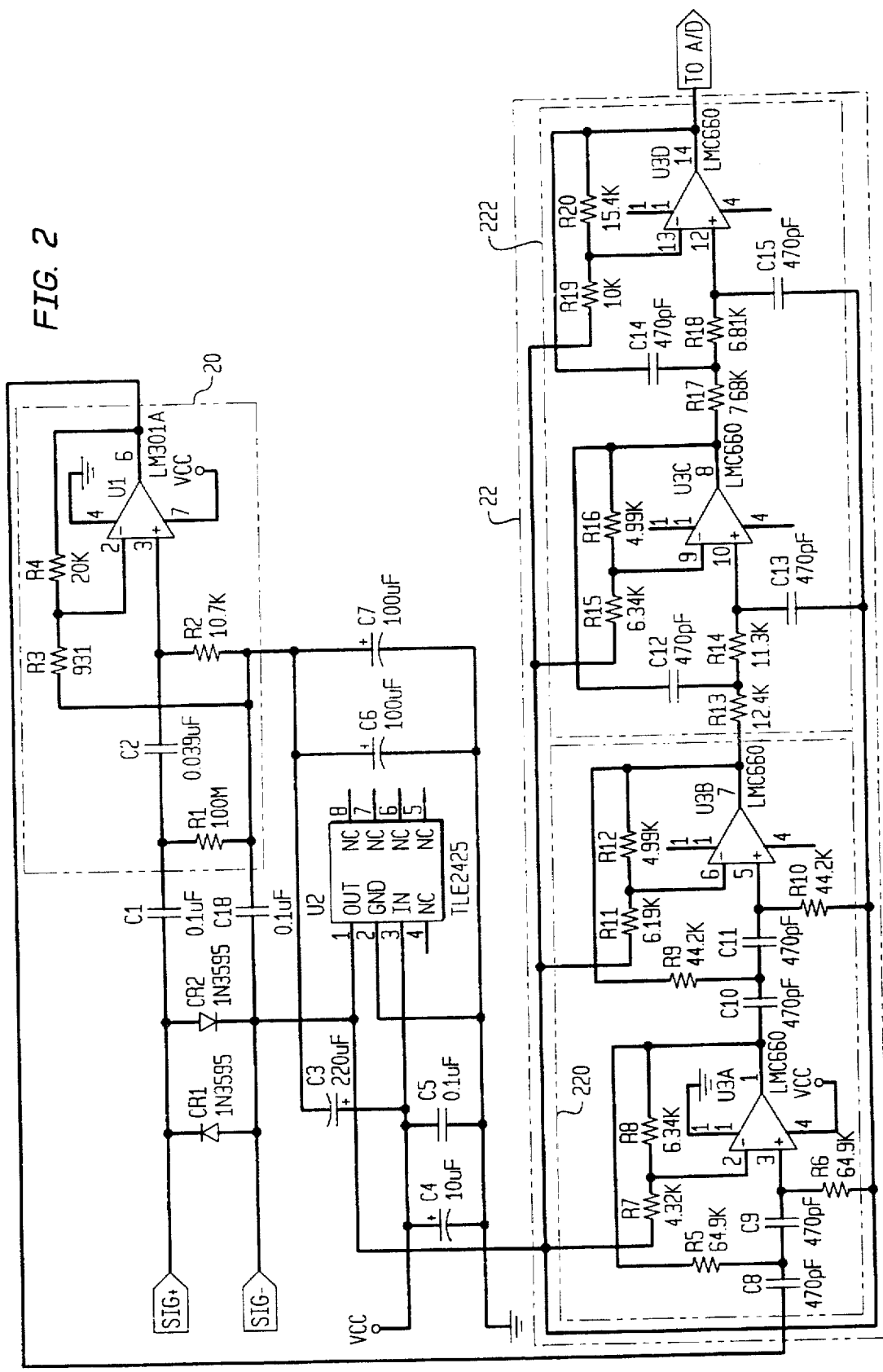
FIG. 2 is a schematic of the pre-amplifier and anti-aliasing filter according to one embodiment of the present invention.
Figure 3A:
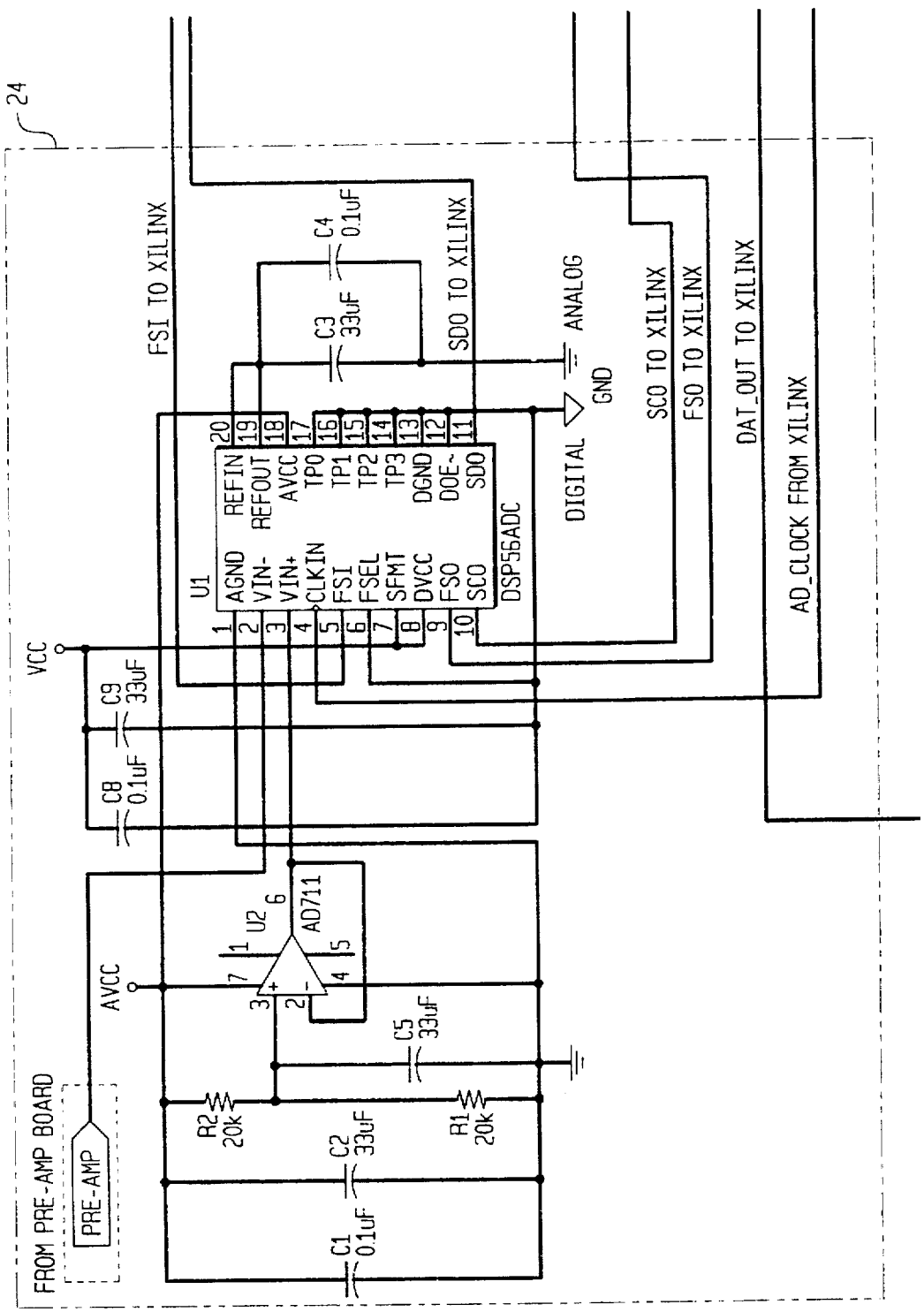
FIGS. 3A–3D are a schematic of the remaining components used in each multiplexing node according to the one embodiment of the present invention.
Figure 3B:
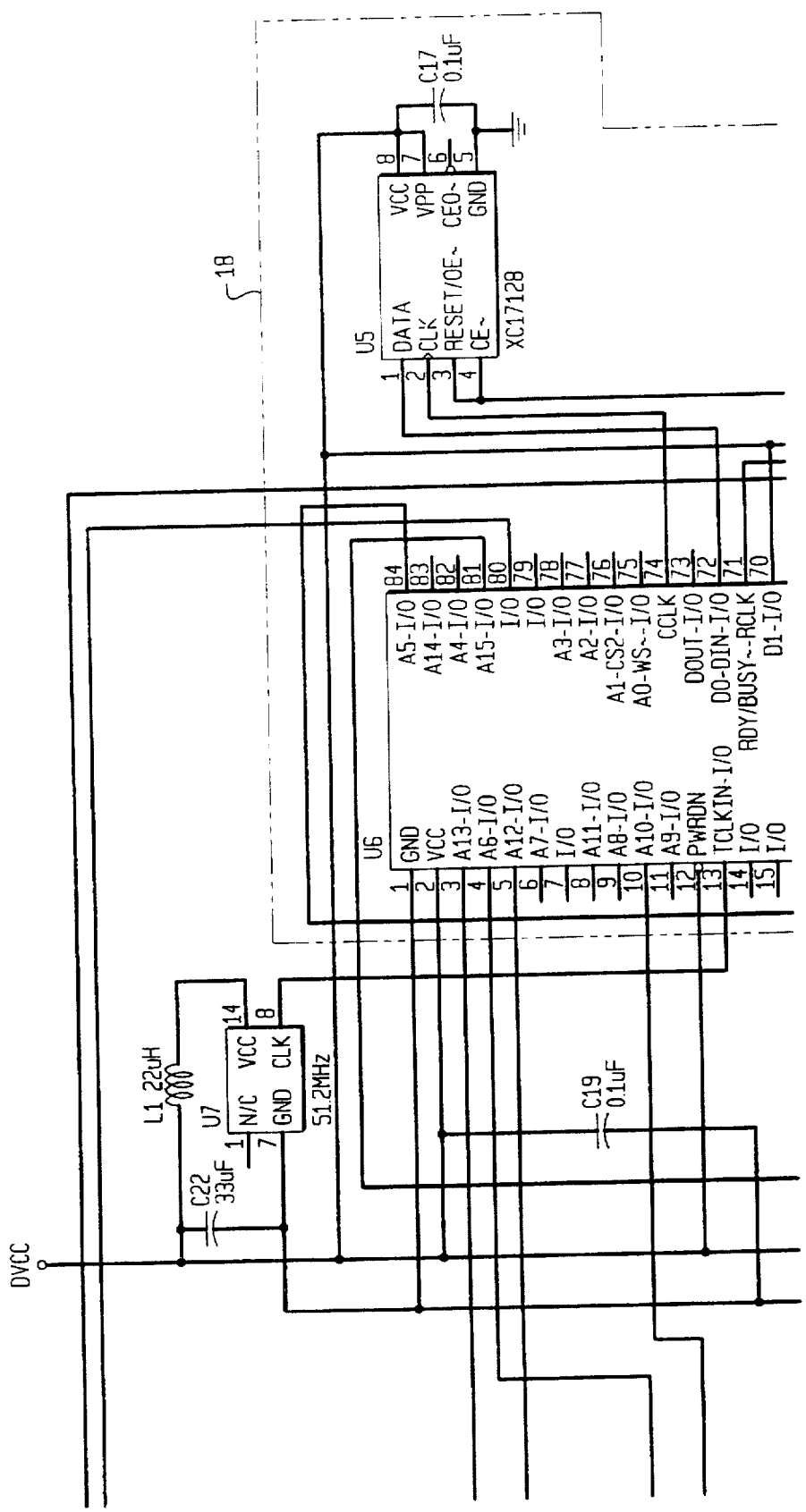
Figure 3C:
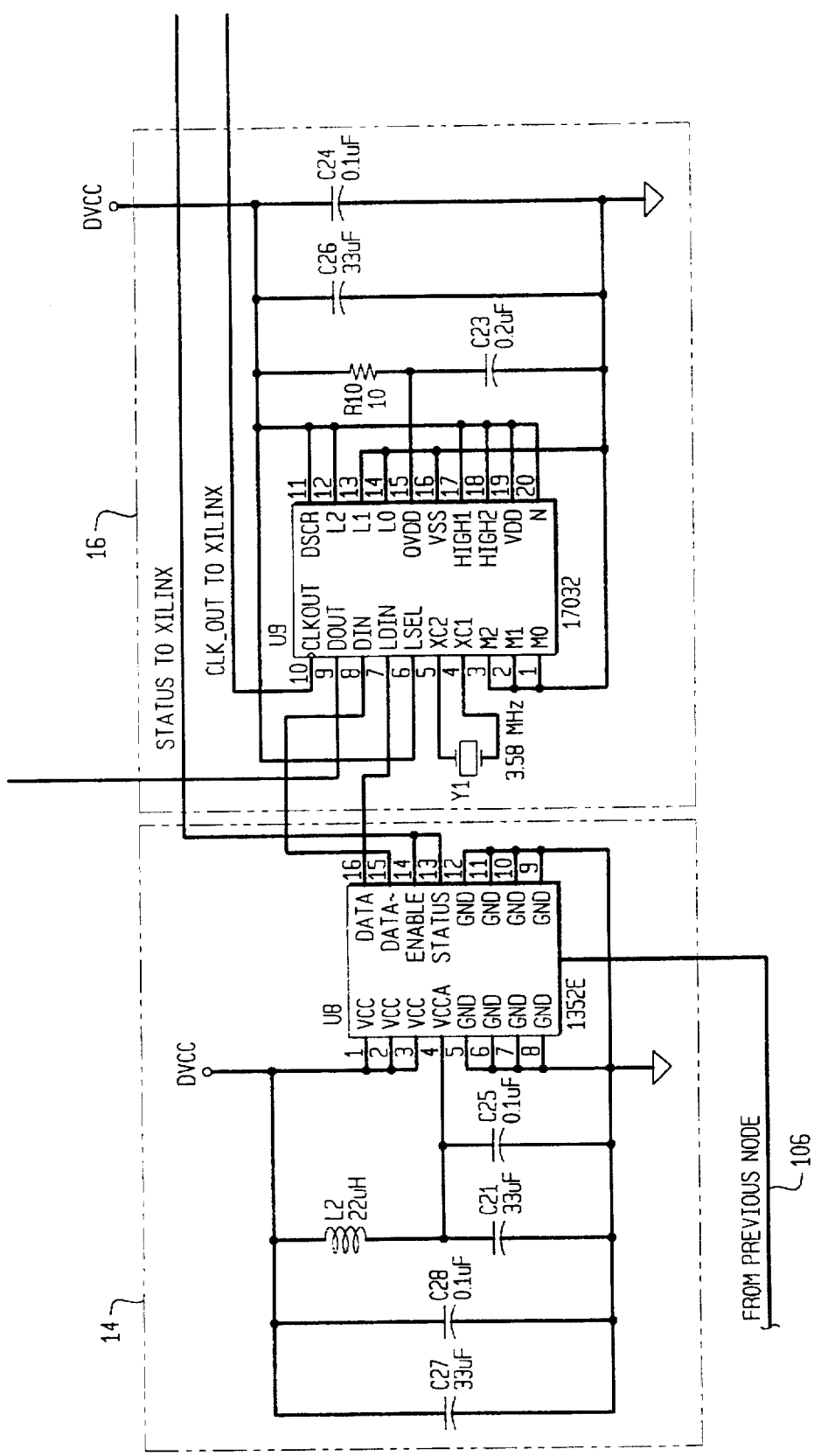
Figure 3D:
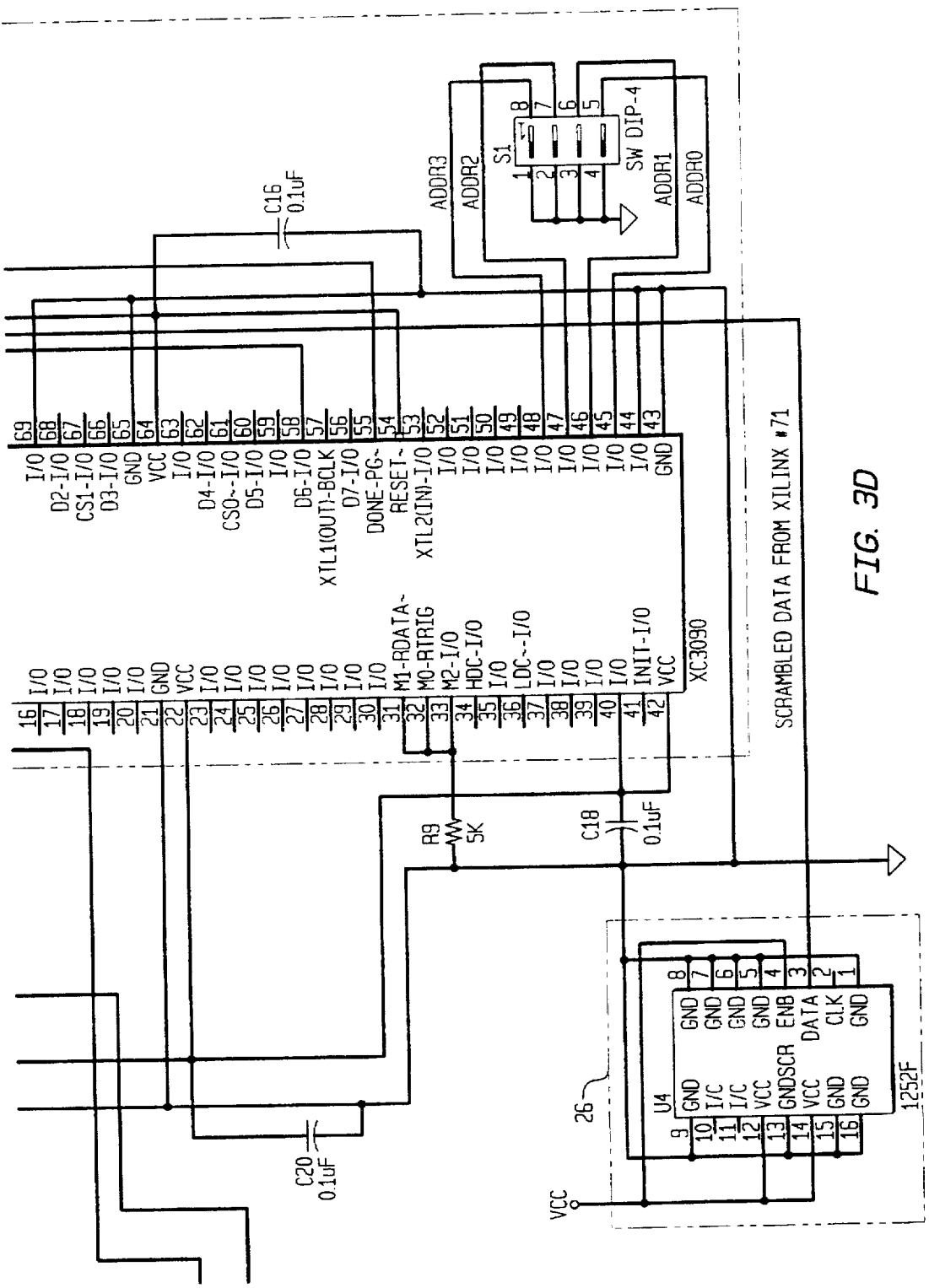

By way of illustrative example, one embodiment of node 10 is shown in FIGS. 2 and 3A–3D. In this example, it is assumed that node 10 is part of the U.S. Navy's Shallow Water In-Line Multiplexed Sensor System (SWIMSS) that operates at a sampling frequency of 100 KHz. In FIG. 2, an 8-pole bandpass filter is implemented as a cascade of a high-pass and a low-pass filter. High-pass filter 220 has four poles implemented with two 2-pole Sallen-Key stages. The first stage is designed with a higher gain to provide a smoother transition at the low frequency cutoff. Low-pass filter 222 also has four poles implemented with two 2-pole Sallen-Key stages with the lower gain of the two stages being applied to the first stage. This prevents filter saturation after the first stage of the low-pass filter and provides a sharp high-frequency cutoff.

An additional advantage of the design of anti-aliasing filter 22 shown in FIG. 2 is that it can operate on a single 5-volt supply. This is accomplished by offsetting the supply signal to the mid range of 2.5 volts and tieing all signal reference points for each of the op-amp (LMC660's) to the 2.5 volt reference signals. In the embodiment of FIG. 2 this is accomplished by feeding the supply voltage ($V_{cc}$) to virtual ground device 210 (TLE 2425) which outputs the 2.5 reference signal on line 212.

The amplified and filtered signals originating from hydrophone 100 are then sampled at analog-to-digital (A/D) converter 24 prior to being input in serial fashion to processor 18. In order to sample at a high-rate and produce a high-resolution digital sample, it is preferable that A/D converter 24 be a sigma-delta type A/D converter using a decimation filter to reduce the data rate. One such commercially available A/D converter is the DSP56ADC16 16-bit sigma-delta A/D converter manufactured by Motorola, Inc (see FIG. 3A). The output from A/D converter 24 includes serial data and output timing controls that include clock and frame synchronization.

Processor 18 receives the sampled data generated at node 10 that originates from the associated hydrophone 100 and data/clock information passed on to node 10 from any upstream nodes. In general, processor 18 multiplexes the current node data with the data from all previous nodes. However, in order to utilize a single cable for the transmission of the array's data, processor 18 multiplexes the node data using a time division multiplexing (TDM) scheme which allocates a time slot for each node's data. Processor 18 must also scramble the multiplexed data before it is transmitted to either the next downstream node or host location. Furthermore, each node's processor 18 is ideally identically configured so that line arrays constructed using node 10 can be easily repaired, lengthened or shortened. One such processor 18 for achieving these goals will now be described with continued reference to FIG. 1 and reference to FIGS. 3A–3D where a schematic is shown of the remaining components of the illustrative embodiment of node 10. To minimize size and power requirements, processor 18 is realized using a field programmable gate array (FPGA). One such commercially available FPGA is the XC3090PC'84-100 manufactured by XILINX, Inc. (see FIGS. 3B and 3D).

Prior to multiplexing any data, processor 18 must first determine if it is the furthest or most upstream node (i.e., the master node) or a downstream node (i.e., a slave node). To do this, processor 18 includes synchronization or synch code detection/generator circuitry 180. Synch code circuitry 180, as it will be referred to hereinafter, checks for the presence of a synch code on the DATA line from descrambler 16. If no synch code is present, synch code circuitry 180 generates the synch code for transmission to the next downstream node. If node 10 generates the synch code, node 10 is known as the master node. Transmitted along with the synch code is the actual node number. Therefore, if any node in the line array fails, the failed node can be easily detected at the host location by checking the control numbers associated with the incoming data stream. For simplicity and ease of interchanging of nodes, the actual or control node number can be manually set by means of, for example, a multi-position dip switch (SW DIP-4) that is typically provided on devices such as the XILINX FPGA mentioned above. If the synch code is detected by synch code circuitry 180, node 10 is a slave node and time division multiplexing (TDM) circuitry 182 is alerted to begin the multiplexing process. Multiple detections of the synch code could be required to prevent the transmission of data from upstream nodes that are only intermittently operable.

Data signals generated at node 10 (originating from hydrophone 100) are buffered in processor 18 at buffer 184 prior to being multiplexed with data from upstream nodes. The buffer is required so that the data from previous nodes passes through node 10 ahead of the data sampled by hydrophone 100.

When TDM circuitry 182 is alerted by synch code circuitry 180, the time-division multiplexing of data begins. The CLOCK from descrambler 16 is used in counting the amount of time required until the data from the current node is to be placed on the output line. The CLOCK is also used to activate the clock input of A/D converter 24 so that all nodes are synchronized.

The multiplexed data is passed to scrambler circuitry 186 where the data and clock must be mixed or combined for transmission on a single (fiber optic) cable. One such scrambling scheme is the $x^7+x^5$ polynomial scrambling developed by AT&T. This scheme uses a polynomial scrambling of the form $y=x^7+x^5$ where y is the scrambled output of the input x. As is known, the polynomial is implemented using a combination of D-flip-flops and exclusive OR gates and is thus easily realized when an FPGA is used for processor 18. Naturally, descrambler 16 must be selected to accept the particular scrambling scheme in order to separate the clock and data from upstream node(s) as described above.

The multiplexed and scrambled data is then transmitted on optical fiber line 108 to the next downstream node or host location. This is accomplished by means of optical transmitter 26 (see FIG. 3D) which converts the electrical signal to an optical signal. Optical transmitter 26 must be capable of supporting the final system data rate and be compatible with the wavelength and mode type of optical fiber line 108.

The advantages of the present invention are numerous. Each node in a line array is implemented by the same electronics configuration thereby simplifying design, manufacture and repair. The identical node design further provides for flexibility in the length of a line array. The node design receives and sends all transmissions over a single (optical) cable thereby making the present invention extremely useful where long-line (i.e., miles long) arrays are required.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. In a sensor system having each of a plurality of multiplexing nodes associated with one of a plurality of analog sensors arranged in a line array, each of said plurality of multiplexing nodes comprising:

an amplifier/filter section coupled to an associated one of the plurality of analog sensors for amplifying and shaping a signal generated by said associated one;

an analog-to-digital (A/D) converter for sampling said signal after amplifying and shaping;

a receiver coupled to a previous one of said multiplexing nodes for receiving scrambled data in serial fashion from said previous one, wherein said scrambled data contains both data information and clock information from said previous one;

a descrambler coupled to said receiver to separate said data information from said clock information for output from said descrambler;

a processor coupled to said A/D converter and said descrambler, said processor checking said data information for the presence of a code, wherein the presence of said code causes said processor to be placed in a slave mode and the absence of said code causes said processor to be placed in a master mode, said processor placed in said master mode adding said code to said data information, said processor multiplexing in a time division fashion said data information, said clock information and said signal, and said processor scrambling said data information, said clock information and said signal; and a transmitter coupled to said processor for transmitting said data information, said clock information and said signal after scrambling in serial fashion over a single data line to a next one of said plurality of multiplexing nodes.

2. A multiplexing node as in claim 1 wherein said single data line is an optical fiber and wherein said receiver is an optical receiver and said transmitter is an optical transmitter.

3. A multiplexing node as in claim 1 wherein said processor is a field programmable gate array.

4. A multiplexing node as in claim 1 wherein said amplifier/filter section comprises:

a preamplifier coupled directly to an associated one of the plurality of analog sensors; and an anti-aliasing filter coupled to said preamplifier.

5. A multiplexing node as in claim 4 wherein said anti-aliasing filter comprises:

a high-pass filter coupled to said preamplifier; and a low-pass filter coupled to said high-pass filter.

* * * * *